(12) United States Patent
Kaneda

(10) Patent No.: US 7,113,330 B2
(45) Date of Patent: Sep. 26, 2006

(54) MICROSCOPE APPARATUS

(75) Inventor: Toru Kaneda, Tokyo (JP)

(73) Assignee: Olympus Corporation, Tokyo (JP)

( * ) Notice: Subject to any disclaimer, the term of this patent is extended or adjusted under 35 U.S.C. 154(b) by 232 days.

(21) Appl. No.: 10/826,042

(22) Filed: Apr. 15, 2004

(65) Prior Publication Data

US 2004/0207915 A1 Oct. 21, 2004

(30) Foreign Application Priority Data

Apr. 15, 2003 (JP) ............................ 2003-110663

(51) Int. Cl.
  *G02B 21/06* (2006.01)
  *G02B 21/00* (2006.01)
  *G02B 9/08* (2006.01)
  *G02B 26/02* (2006.01)

(52) U.S. Cl. ...................... 359/388; 359/368; 359/385

(58) Field of Classification Search ........ 359/368–390, 359/227–236, 738–740
See application file for complete search history.

(56) References Cited

U.S. PATENT DOCUMENTS

| 4,673,260 A | * | 6/1987 | Steinberg .................... 359/377 |
| 4,880,294 A | | 11/1989 | Brakenhoff .................. 359/230 |
| 5,299,053 A | * | 3/1994 | Kleinburg et al. .......... 359/227 |
| 5,488,509 A | * | 1/1996 | Takahashi et al. .......... 359/385 |
| 5,708,526 A | * | 1/1998 | Stankewitz .................. 359/386 |
| 6,396,628 B1 | | 5/2002 | Osa et al. .................... 359/385 |
| 6,456,430 B1 | * | 9/2002 | Kasahara et al. ........... 359/380 |
| 6,891,671 B1 | * | 5/2005 | Greenberg .................. 359/388 |
| 2002/0191281 A1 | | 12/2002 | Osa et al. .................... 359/385 |
| 2004/0134889 A1 | | 7/2004 | Bartzke et al. .......... 219/121.6 |

FOREIGN PATENT DOCUMENTS

| EP | 0 280 375 A1 | 8/1988 |
| EP | 1 008 884 A1 | 6/2000 |
| EP | 102 44 850 A1 | 4/2004 |
| JP | 11-133308 A | 5/1999 |

\* cited by examiner

*Primary Examiner*—Thong Q Nguyen
(74) *Attorney, Agent, or Firm*—Frishauf, Holtz, Goodman & Chick, P.C.

(57) ABSTRACT

An area-light source outputs uniform area light on a sample. A wedge diaphragm is placed between the area-light source and the sample. The wedge diaphragm has a notch. The wedge diaphragm is moved in a direction perpendicular to the optical axis of the area light so as to adjust an amount of the area light passing through the sample.

17 Claims, 5 Drawing Sheets

WEDGE ANGLE $\alpha = 10°$ TO $45°$
RATIO OF AREAS $S_A : S_B = 1.03 : 1$ TO $1.3 : 1$

MICROSCOPE APPARATUS

BACKGROUND OF THE INVENTION

1) Field of the Invention

The present invention relates to a microscope apparatus and, more particularly, relates to a fluorescent stereomicroscope.

2) Description of the Related Art

Stereomicroscopes are widely used in the field of biochemistry; because, the stereomicroscopes enable stereoscopic observation of samples of various sizes and even living specimens.

However, if the sample is thin and, particularly, if a lot of such samples are present in a culture medium, because there is no visible contrast between the samples and the background, it becomes difficult for an observer to identify individual samples.

One approach is to provide a shade between an area-light source, which emits uniform area light on the sample, and the sample and continuously adjust the light of the area-light source that is incident directly on an object lens (Japanese Patent Application Laid-open Publication No. H11-133308).

Other approach is use a fluorescent stereomicroscope. In the case of the fluorescent stereomicroscope, a GFP (Green Fluorescent Protein) dye that emits fluorescence is applied on the sample so that the sample itself becomes fluorescent and emits light.

The eel worm is the example of thin sample. The eel worms are useful for the research of expression pattern of genes because cell lineage for all cells of the eel worm is already known. By applying a GFP dye on a specific ones (dyed eel worms) of a plurality of living eel worms (non-dyed eel worms), it becomes possible to carry out ecological observation of the dyed eel worm.

SUMMARY OF THE INVENTION

It is an object of the present invention to solve at least the problems in the conventional technology.

A microscope apparatus according to the present invention includes an area-light source that outputs a uniform area light, wherein the area light passes through a sample; a plurality of eye pieces to simultaneously observe the sample, each eye piece having a field of view and the fields of view of all the eye pieces are aligned in a direction perpendicular to an optical axis of the area light; an adjusting unit includes a notch that extends in the direction perpendicular to the optical axis of the area light, and a width of the notch changes in a predetermined manner, wherein an amount of the area light passing through the sample is adjusted by moving the adjusting unit in the direction perpendicular to the optical axis of the area light.

The other objects, features, and advantages of the present invention are specifically set forth in or will become apparent from the following detailed description of the invention when read in conjunction with the accompanying drawings.

DETAILED DESCRIPTION

Exemplary embodiments of a microscope apparatus according to the present invention are explained below with reference to the accompanying drawings.

Figure 1:
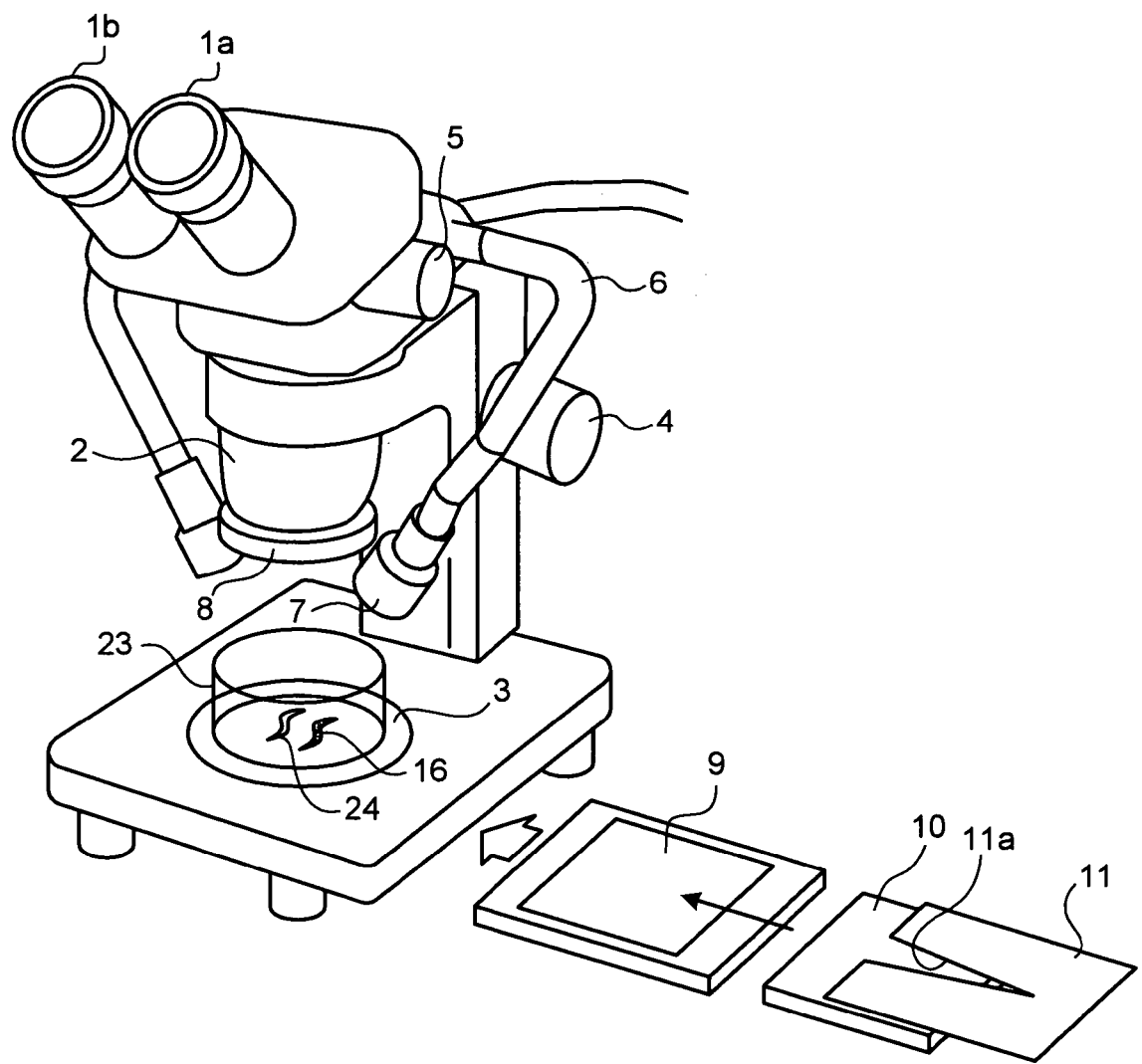
FIG. 1 is a perspective of a microscope apparatus according to an embodiment of the present invention.

FIG. 1 is a perspective of a microscope apparatus according to an embodiment of the present invention. The microscope apparatus is a fluorescent stereomicroscope and has an optical system and a fluorescent optical system. The optical system includes an area-light source 9, a neutral-density filter 10, a wedge diaphragm 11, an absorption filter 8, a microscope body 2, a right eye piece 1a, a left eye piece 1b. The fluorescent optical system includes a light guide 6, an excitation filter 7, and the absorption filter 8.

Thin samples 16 and 24 are placed in a Petri dish 23 and the Petri dish 23 is placed on a sample stage 3. The area-light source 9 emits a light that is uniform over surface and the light is attenuated at the neutral-density filter 10. The light is then adjusted to a ratio of amount of light corresponding to fields of view of the right eye and the left eye by the wedge diaphragm 11 and passes through the samples 16 and 24. The absorption filter 8 allows only the fluorescent light band to pass so that no scattering light enters the microscope body 2. Finally, the light reaches the right eye piece 1a and the left eye piece 1b through the microscope body 2.

The samples 16 and 24 have been dyed with a fluorescent dye. An excitation light source (not shown) emits a light corresponding to the fluorescent dye with which the sample has been dyed. The flexible light guide 6 guides the excitation light, the excitation filter 7 filters the excitation light, and the excitation light illuminates the samples 16 and 24. As a result of illumination by the excitation light, the samples 16 and 24 irradiate fluorescent light. The fluorescent light passes through the absorption filter 8. The absorption filter 8 allows only the fluorescent light band to pass so that no scattering light enters the microscope body 2. Finally, the fluorescent light reaches the right eye piece 1a and the left eye piece 1b through the microscope body 2.

The observer operates a focus handle 4 to perform focusing, and operates a variable-power handle 5 to perform magnification-adjustment.

The neutral-density filter 10 is placed above the area-light source 9 and the wedge diaphragm 11 is placed above the neutral-density filter 10. The assembly of the area-light source 9, the neutral-density filter 10, and the neutral-density filter 10 is placed under the sample stage 3.

The wedge diaphragm 11 has a wedge-shaped notch 11a that is perpendicular to an optical axis of the light radiated by the area-light source 9. In other words, width of the notch 11a changes monotonously in a direction that is at right angle to a direction in which the centers of fields of view $11_A$ and $11_B$ (refer to FIG. 2) corresponding to the right eye piece 1a and the left eye piece 1b are aligned. As a result, the light irradiated by the area-light source 9 reaches the right eye piece 1a and the left eye piece 1b through areas $S_A$ and $S_B$ respectively, which are different regions of passing of light. Therefore, the amounts of lights that reach the right eye piece 1a and the left eye piece 1b respectively are different. Concretely, the amount of light that reaches the right eye piece 1a is greater than that reaches the left eye piece 1b.

The wedge diaphragm 11 is slidable, on the neutral-density filter 10, in a direction parallel to the length of the wedge-shaped notch 11a. If the wedge diaphragm 11 is slide, there is produced a change in a ratio of the transmitting areas $S_A$ and $S_B$ of the fields of view $11_A$ and $11_B$ as well as the total amount of light through each of the transmitting areas $S_A$ and $S_B$. The observer can slide the wedge diaphragm 11 to a desirable position. Although the observer is required to adjust the position of the wedge diaphragm 11, it is possible to easily, finely, and accurately perform adjustment of the amount of light and contrast.

Figure 2:
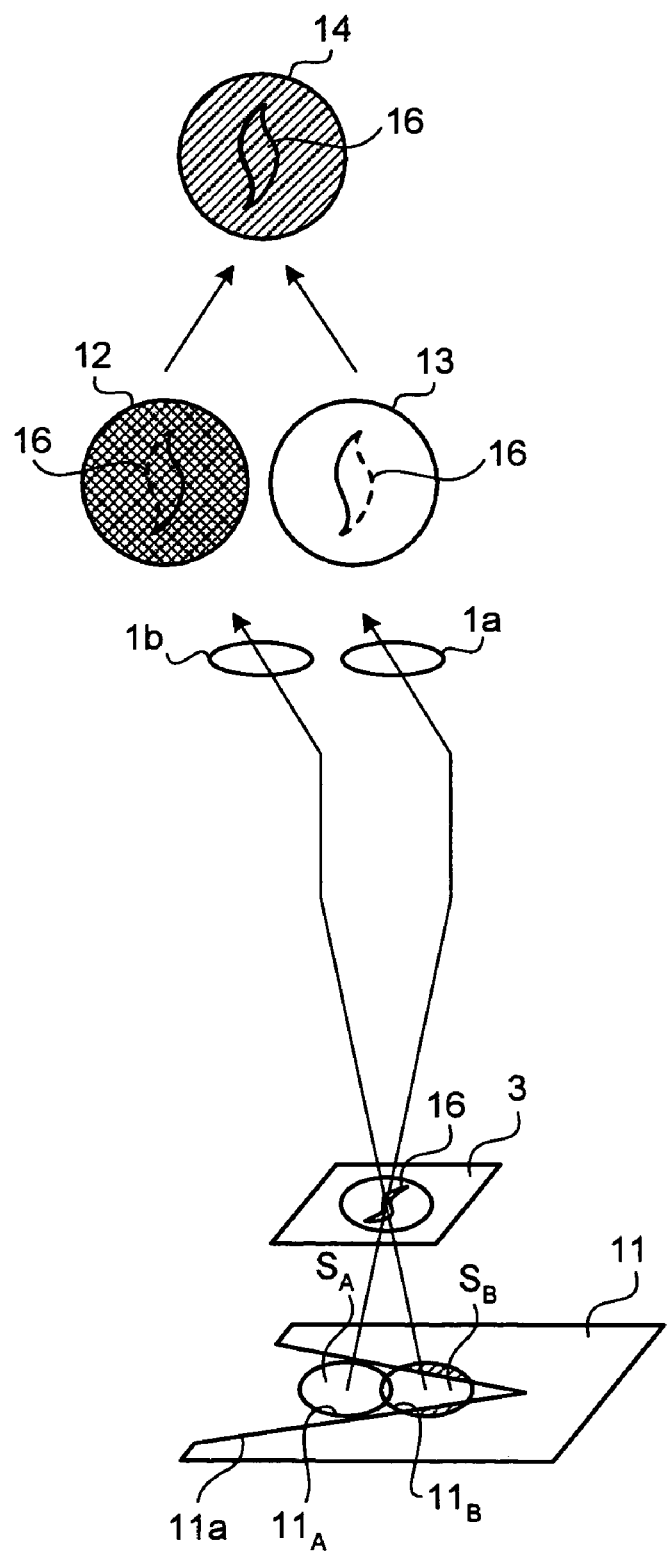
FIG. 2 is a view when looked through the microscope apparatus.

FIG. 2 is a schematic for explaining how a contrast is provided to the sample 16. The sample 16 is observed through the right eye piece 1a and the left eye piece 1b with the right eye piece 1a and the left eye piece 1b inclined with respect to the sample 16. As a result, the field of view $11_A$ which corresponds to the right eye piece 1a and the field of view $11_B$ which corresponds to the left eye piece 1b, are formed on the wedge diaphragm 11.

Because larger amount of light passes through the field of view $11_A$, light irradiated which is incident from under the wedge diaphragm 11 corresponds to the transmitting area $S_A$ and is sent to a side of the right eye piece 1a almost without being attenuated. On the other hand, because larger amount of light passes through the field of view 11B, light irradiated that is incident from under the wedge diaphragm 11 corresponds to the transmitting area $S_B$ and is sent to a side of the right eye piece 1b after being attenuated. Although no part of the field of view $11_A$ is shaded by the wedge diaphragm 11 and an area of the field of view $11_A$ itself is equivalent to the transmitting area $S_A$, it is not limited to this. Some portion of the field of view $11_A$ may be shaded by the wedge diaphragm 11.

The observer sees a right image 13 through the right eye piece 1a and sees a left image 12 through the left eye piece 1b. Since the sample 16 is thin, a difference in the amount of light passing through the sample 16 is unnoticeable if only the right image 13 or only the left image 12 is seen. In this case, only by each of the single image, only a little shade due to effect of an inclined viewing is visible on one side of the sample 16.

The right image 13 is brighter because there is a little attenuation of the light, and the left image 12 is darker because there is greater attenuation of the light. However, because the sample is observed by inclined viewing, a shadow appears at a portion on the border of the sample 16 in the right image 13, a shadow appears at a portion, which is different from the portion where the shadow appears in the right image 13, on the border of the sample 16 in the left image 12.

The observer sees a combined image 14 of the right image 13 and the left image 12. The combined image 14 is recognized as an image that is obtained by addition of an amount of light of each portion of the right image 13 and an amount of light of each portion of the left image 12.

The combined image 14 is brighter than the left image 12 and darker than the right image 13. Further, in the combined image 14, the shadows of the outline of the sample which are visible in the right image 13 and the left image 12, are combined. A shadow is formed in the overall outline of the sample 16 due to the combined shadow. As a result, due to contrast of the shadow that is formed on the overall outline of the sample 16 with the background, there is a contrast in the overall outline of the sample 16. Further, due to the contrast, the observer observes the sample 16 as an object, and can observe it as a stereoscopic image.

Let us assume that the samples 16 and 24 are eel worms, the sample 16 is a non-dyed sample and the sample 24 is a dyed sample, and the job is to collect only the sample 24.

Because the sample 24 is a dyed sample, it emits the fluorescent light and also allows the light from the area-light source 9 to pass through. Because the sample 16 is a non-dyed sample, it does not emit any fluorescent light, but allows only the light from the area-light source 9 to pass through.

Furthermore, since the amount of fluorescent light emitted from the sample 24 is small, for the sample 24 to be visible, the amount of the background light is suppressed by adjusting the amount of light from the area-light source 9 and adjusting the amount of light attenuated by the neutral-density filter 10. The sample 16 is not visible since there is no contrast irrespective of the amount of light of the background. Moreover, if the amount of the background light is suppressed excessively, the sample 16 is not visible even if there is a contrast. Therefore, the observer forms the shadow mentioned above, on the combined image 14 of the sample 16 by adjusting the amount of light attenuated by the neutral-density filter 10 and by using the wedge diaphragm 11, allows the whole outline to contrast, thereby making the stereoscopic image visible. In other words, the observer is able to classify simultaneously and reliably the samples 16 and 24, where the sample 24 is classified due to a difference of the amount of light with the background and the sample 16 is classified by the contrast of the overall outline.

Figure 3:
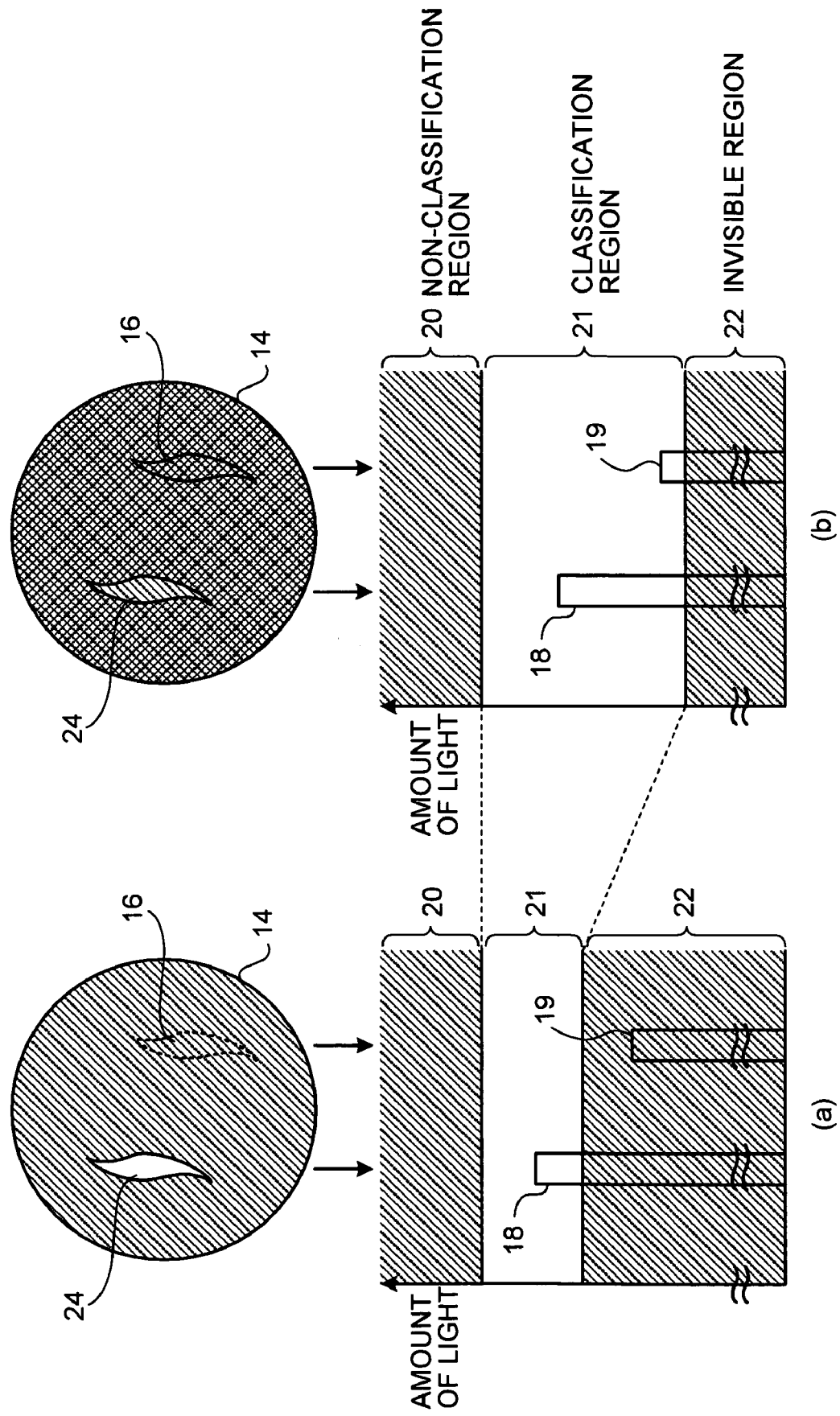
FIG. 3 is a schematic for explaining a classification region.
Figure 4:
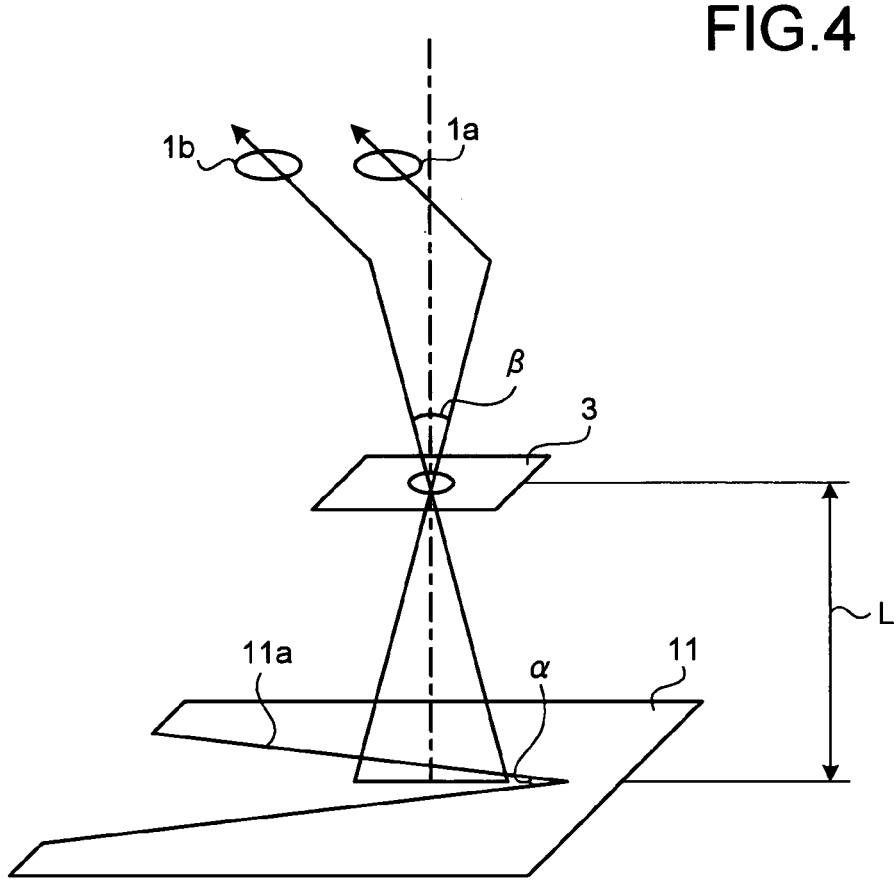
FIG. 4 shows relations among parameters that define a wedge diaphragm.

Further, how the classification is performed reliable is described in detail by referring to FIG. 3. An invisible region 22 is a region in which the human brain cannot recognize a sample visually because an amount of light is small. Moreover, a classification region 21 is a region in which the human brain can visually recognize a sample separately because an amount of light is moderate. Further, a non-classification region 20 is a region in which the human brain can recognize a sample visually but cannot recognize the sample separately. A relationship of range and amount of light is not absolute but relative and as mentioned later, the sample is allowed to have a contrast by the wedge diaphragm 11 and classification region is allowed to expand.

(a) in FIG. 3 corresponds to a case in which an adjustment is made so that an amount of light 18 is in the classification region 21 by suppressing the amount of light in the background by using the neutral-density filter 10, to be able to classify the sample 24. In this case, an amount of light 19 from the sample 16 disappears in the invisible region 22 and an existence of the sample 16 cannot be recognized as shown by broken lines. Therefore, in this case, the sample 16 and the sample 24 cannot be classified.

(b) in FIG. 3 corresponds to a case in which the sample 16 is in the classification region 21 as a result of contrast of the sample 16 that is caused by inserting the wedge diaphragm 11 on the top surface of the neutral-density filter 10. When the wedge diaphragm 11 which is a sort of the shading object, is inserted on the top surface of the neutral-density filter 10, the amount of light 18 from the sample 24 as well as the amount of light 19 from the sample 16 are caused to attenuate, and at the same time, the sample, particularly the sample 16 is caused to have a contrast as shown by solid lines and the practical classification region 21 is expanded. Since an expansion width of the classification region 21 is wider than a reduced width of the amount of light in the background, the sample 24 of the amount of light 18 can be classified more easily. The sample 16 of the amount of light 19 comes in the classification region 21 and the sample 24 and the sample 16 can be classified simultaneously.

Ranges of parameters which regulate the wedge diaphragm 11 that could classify the sample 16 and the sample 24 reliably and practically are described. To start with, let an opening angle of the notch 11a of the wedge diaphragm 11 be α, let an angle of inclination between optical axes through which the sample is subjected to inclined viewing be β, and let a distance between the wedge diaphragm 11 and the sample stage 3 be L.

Figure 5:
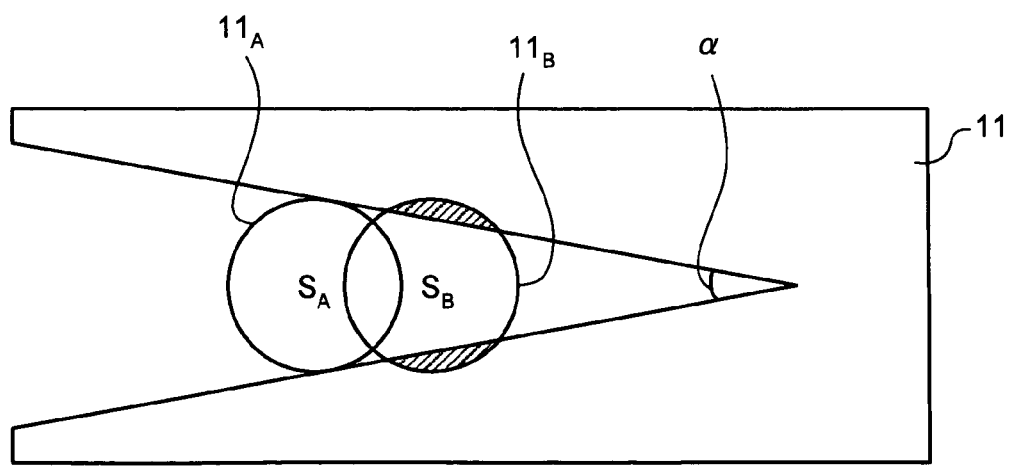
FIG. 5 shows relations between an angle of a notch of the wedge diaphragm and corresponding light transmitting areas of fields of view.

In the practical microscope apparatus, values of the angle of inclination β and the distance L could not be changed much and as shown in FIG. 5, a range in which the sample 16 and the sample 24 can be classified, was calculated from a relationship of the opening angle α and each transmitting area $S_A$ and $S_B$ of the light of the fields of view $11_A$ and $11_B$ corresponding to the opening angle α. As a result, when the value of the opening angle α changed from 10° to 45° and when a ratio of the transmitting areas $S_A:S_B$ became 1.03:1 to 1.3:1, the sample 16 and the sample 24 could be classified reliably.

Moreover, when the value of the opening angle α and the ratio of the transmitting areas $S_A:S_B$ were regulated, the other parameters viz. the angle of inclination β and the distance L were:
β=10° to 15°
L=20 millimeters (mm) to 60 mm.

Moreover, it was confirmed that an ideal combination of the parameter values with which the sample 16 and the sample 24 can be classified reliably, is as follows:
α=15°
β=10°
L=27 mm
$S_A:S_B$=1.05:1

According to the present invention, the sample 16 and the sample 24 can be classified reliably by moving adjustment of the wedge diaphragm 11. Concretely, even if a dyed eel worm and a non-dyed eel worm are mixed and are close to each other, only the dyed eel worm can be collected reliably.

It is explained above to prepare a plurality of wedge diaphragms 11 select a wedge diaphragm having a desirable opening angle α; however, a wedge diaphragm with a variable opening angle can also be prepared. By doing so, it is possible to set and select an ideal opening angle α corresponding to a difference in the amount of fluorescent light and the amount of transmitting light, thereby enabling an ideal classification of each separate sample reliably and easily.

Figure 6A:
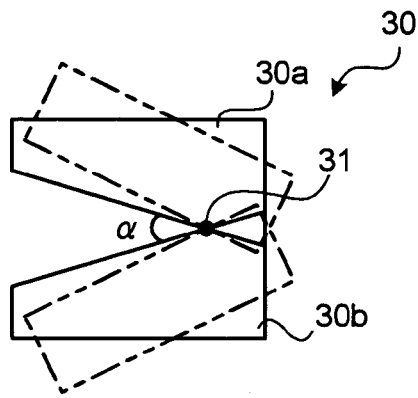
FIG. 6A is a plan view and FIG. 6B is a side view of an exemplary wedge diaphragm.
Figure 6B:
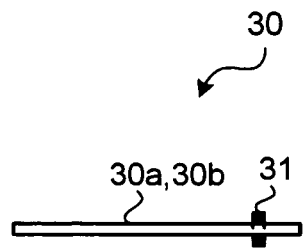

FIG. 6A is plan view of a wedge diaphragm 30 with a variable opening angle, and FIG. 6B is a side view of the wedge diaphragm 30. The wedge diaphragm 30 is formed by overlapping two plates 30a and 30b and can be turned around a shaft 31 as a center. An opening angle α can be set as desired by turning the wedge diaphragm pieces 30a and 30b around the shaft 31.

Figure 7A:
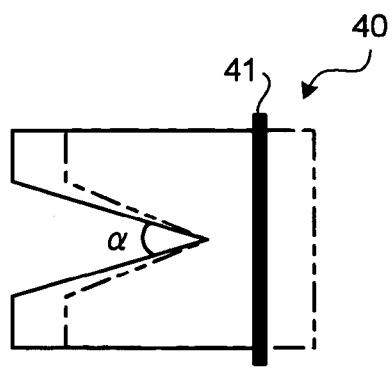
FIG. 7A is a plan view and FIG. 7B is a side view of another exemplary wedge diaphragm.
Figure 7B:
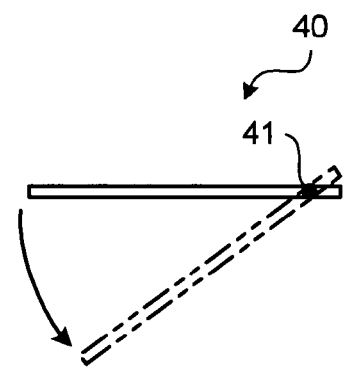

FIG. 7A is plan view of a wedge diaphragm 40 with a variable opening angle, and FIG. 7B is a side view of the wedge diaphragm 40. The wedge diaphragm 40 has a same shape as that of the wedge diaphragm 11 except for a shaft 41 that is provided on one end of a longitudinal direction and the notch can be turned around in a direction of an optical axis with the shaft 41 as a center. Due to this turning, a shape of the notch changes practically according to the light irradiated and the opening angle α of the notch can be set voluntarily.

Figure 8A:
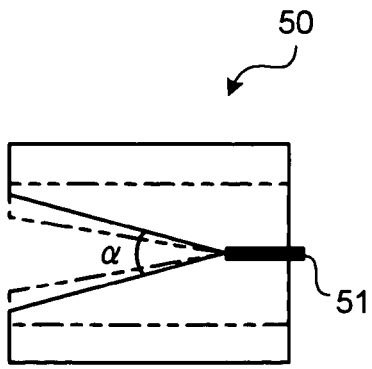
FIG. 8A is a plan view and FIG. 8B is a side view of still another exemplary wedge diaphragm.
Figure 8B:
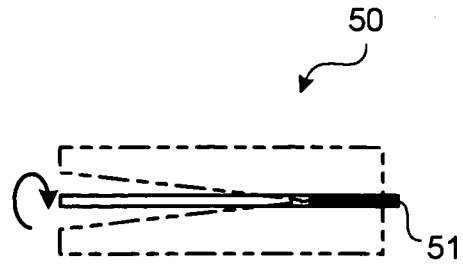

FIG. 8A is plan view of a wedge diaphragm 50 with a variable opening angle, and FIG. 8B is a side view of the wedge diaphragm 50. The wedge diaphragm 50 has a same shape as that of the wedge diaphragm 11 except for a shaft 51 which is a central line of the notch and is provided on a side where the width of the notch is becoming narrow. The notch can be turned around the shaft 51. Due to this turning, a shape of the notch changes practically according to the light irradiated and the opening angle α of the notch can be set voluntarily.

The wedge diaphragms may be a suitable combination of the wedge diaphragms 30, 40, 50. The opening angle α of each wedge diaphragm 30, 40, 50 shows different displacement according to an amount through which it is turned and by combining these, the opening angle can be adjusted with more flexibility.

Moreover, in the embodiment mentioned above, notches of the wedge diaphragms 11, 30, 40, and 50 have shapes cut in straight lines and the width of the notch changes monotonously. However, it is not limited to this and the notch may have a shape cut in a curved line, or have a protrusion on an inner side or a dent on an outer side with a width changing monotonously. Further, the notch may not have a continuous shape and the width of the notch may change in steps. The essential is that the fine adjustment of passing light in each field of view together with the movement and turning of the wedge diaphragms 11, 30, 40, and 50 should be possible.

Thus as described above, according to this invention, even if fluorescent and non-fluorescent samples are mixed in a medium, the fluorescent sample can be separated reliably and at ease.

Moreover, by providing a variable opening angle of a wedge diaphragm, it is possible to attenuate light moderately while observing a sample and there is no need to change the wedge diaphragm every time whenever the observation is made, thereby reducing cost and time for the observation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A microscope apparatus comprising:
   an area-light source which faces a sample to output a uniform area light, and which directs the light towards two irradiation regions corresponding respectively to a right field of view and a left field of view;
   two eye pieces, including a right eye piece which has the right field of view and a left eye piece that has the left field of view, to simultaneously observe the sample, the fields of view of the eye pieces being aligned in a direction perpendicular to an optical axis of the area light;
   an adjusting unit which is provided between the area-light source and the sample, and which includes a notch that extends in the direction perpendicular to the optical axis of the area light and that has a width which changes in a predetermined manner along the two irradiation regions;
   wherein an amount of the area light passing through each of the fields of view is adjustable by moving the adjusting unit in the direction perpendicular to the optical axis of the area light.

2. The microscope apparatus according to claim 1, wherein the adjusting unit is movable in the direction along which the two irradiation regions are arranged, so as to adjust the amount of the area light passing through each of the right and left fields of view while adjusting a total amount of light that is incident on the right and left fields of view.

3. The microscope apparatus according to claim 1, wherein the width of the notch changes monotonously.

4. The microscope apparatus according to claim 1, wherein the width of the notch changes continuously.

5. The microscope apparatus according to claim 1, wherein the sample includes a fluorescent object and a non-fluorescent object and both the fluorescent object and the non-fluorescent object are visible.

6. The microscope apparatus according to claim 1, wherein the sample includes a plurality of non-fluorescent objects and the non-fluorescent objects are visible.

7. The microscope apparatus according to claim 1, wherein the sample includes a plurality of non-fluorescent objects mixed in a culture medium and the non-fluorescent objects are visible.

8. The microscope apparatus according to claim 1, wherein a ratio of areas of the two irradiation regions through which the area light from the area-light source passes is between 1.03:1 and 1.3:1.

9. The microscope apparatus according to claim 1, wherein the notch is wedge-shaped.

10. The microscope apparatus according to claim 9, wherein an angle between sides of the notch is between 10° and 45°.

11. The microscope apparatus according to claim 1, wherein the sample is positioned at a position that is 20 millimeters to 60 millimeters away from the adjusting unit.

12. The microscope apparatus according to claim 1, wherein an angle of inclination formed by two optical axes extending from the sample to the right and the left eye pieces, respectively, is between 10° and 15°.

13. The microscope apparatus according to claim 1, wherein the adjusting unit comprises two light shading objects which are capable of pivoting around a point joint and in which the notch is formed.

14. The microscope apparatus according to claim 1, wherein the adjusting unit comprises a light shading object in which the notch is formed.

15. The microscope apparatus according to claim 1, wherein the adjusting unit comprises two light shading objects which are capable of pivoting around a line joint and in which the notch is formed.

16. A microscope apparatus comprising:
an area-light source which faces a sample to output a uniform area light, and which the directs light towards two irradiation regions corresponding respectively to a right field of view and a left field of view;
two eye pieces, including a right eye piece which has the right field of view and a left eye piece which has the left field of view, to simultaneously observe the sample, the fields of view of the eye pieces being aligned in a direction perpendicular to an optical axis of the area light; and
an adjusting unit which includes a notch that is tiltable with respect to the area-light source, wherein a width between sides of the notch changes continuously, and wherein an amount of the area light passing through the sample from the two irradiation regions is adjusted by moving the adjusting unit.

17. A microscope apparatus comprising:
an illuminating unit which faces a sample to output a uniform area light, and which directs the light towards two irradiation regions corresponding respectively to a right field of view and a left field of view;
a right observation unit which has the right field of view and a left observation unit which has the left field of view, to simultaneously observe the sample, the fields of view of the observation units being aligned in a direction perpendicular to an optical axis of the area light emitted from the illuminating unit; and
an adjusting unit which is provided between the illuminating unit and the sample, and which includes a notch that extends in the direction perpendicular to the optical axis of the area light emitted from the illuminating unit and that has a width which changes in a predetermined manner along the two irradiation regions;
wherein an amount of the area light passing through each of the fields of view is adjustable by moving the adjusting unit in the direction perpendicular to the optical axis of the area light emitted from the illuminating unit.

* * * * *